Figure 1:
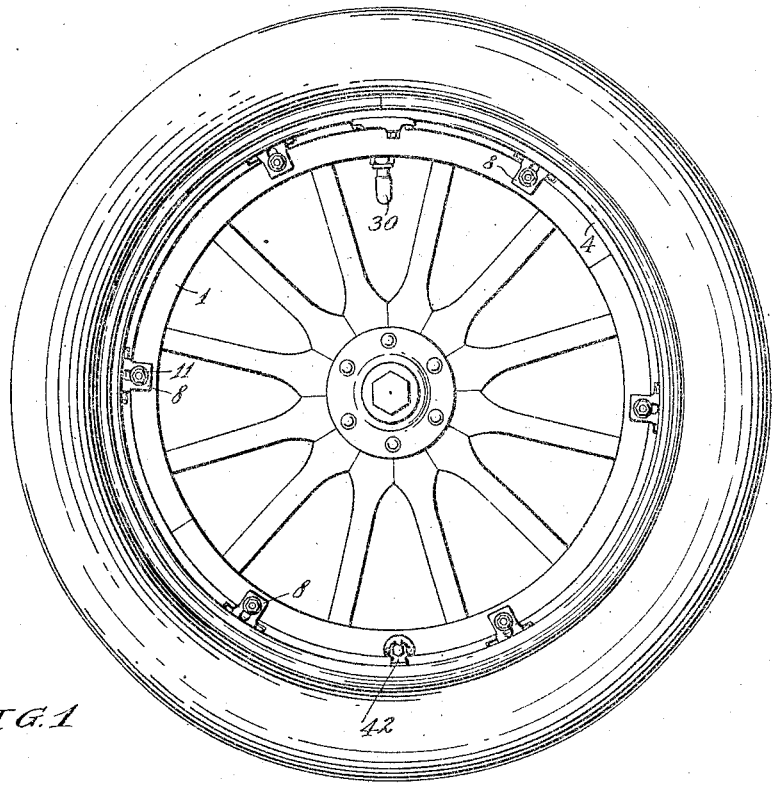

R. S. BRYANT.
RIM FOR VEHICLE WHEELS.
APPLICATION FILED APR. 25, 1912.

1,216,278.

Patented Feb. 20, 1917.
3 SHEETS—SHEET 1.

WITNESSES:

INVENTOR,
Richard S. Bryant,
BY Hull & Smith
ATTYS.

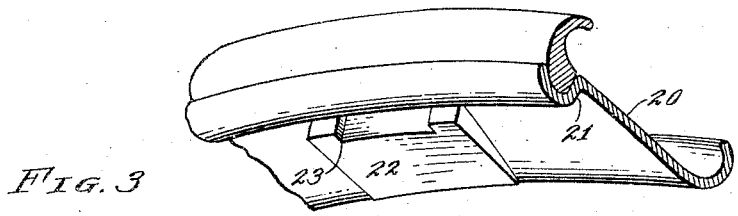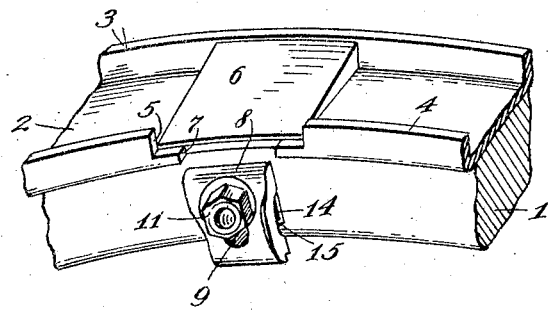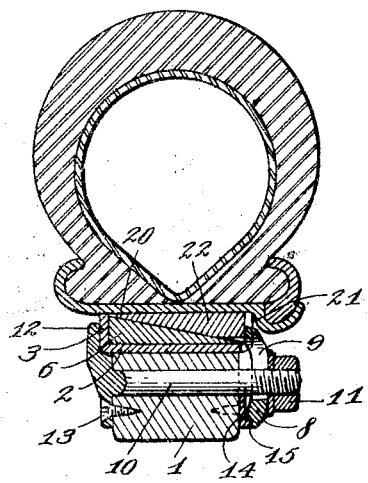

R. S. BRYANT.
RIM FOR VEHICLE WHEELS.
APPLICATION FILED APR. 25, 1912.
1,216,278.
Patented Feb. 20, 1917.
3 SHEETS—SHEET 3.
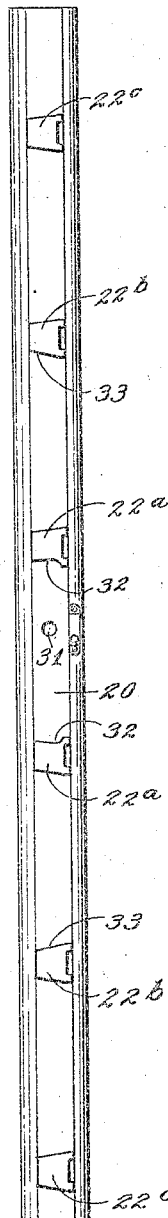
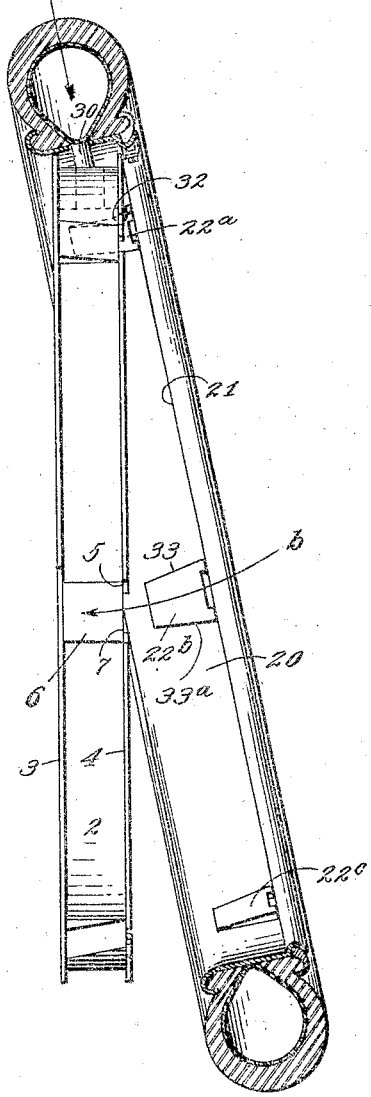
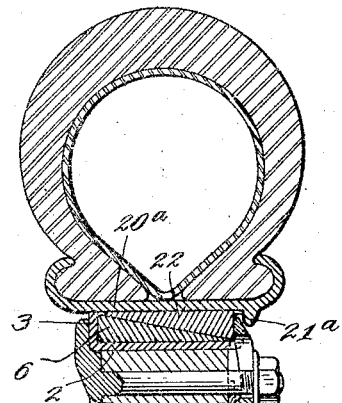
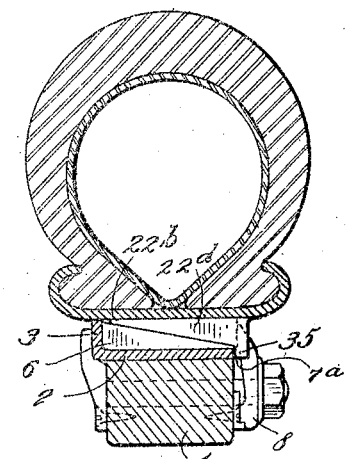
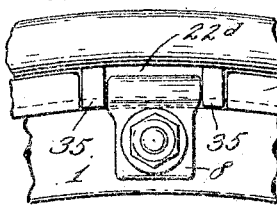
WITNESSES:
Brennan B. West
Hugh B. McGill
INVENTOR,
Richard S. Bryant
By Hull & Smith
ATTYS

UNITED STATES PATENT OFFICE.

RICHARD S. BRYANT, OF CLEVELAND, OHIO, ASSIGNOR TO THE STANDARD WELDING COMPANY, OF CLEVELAND, OHIO, A CORPORATION OF OHIO.

RIM FOR VEHICLE-WHEELS.

1,216,278.

Specification of Letters Patent.

Patented Feb. 20, 1917.

Application filed April 25, 1912. Serial No. 693,080.

*To all whom it may concern:*

Be it known that I, RICHARD S. BRYANT, a citizen of the United States, residing at Cleveland, in the county of Cuyahoga and State of Ohio, have invented a certain new and useful Improvement in Rims for Vehicle-Wheels, of which the following is a full, clear, and exact description, reference being had to the accompanying drawings.

This invention relates to vehicle wheels and particularly to that type of wheel wherein is provided a detachably secured tire-receiving rim. The general object of such a construction, as is well known, is to permit an extra rim provided with a fully inflated pneumatic tire to be carried upon an automobile so that in case of tire troubles this new rim can be expeditiously and conveniently substituted for one originally upon the wheel. Prior devices of this character have frequently been of cumbersome, ponderous, and unsightly construction, complicated and expensive to manufacture, unreliable in operation, and poorly adapted to the exposure, vibration, wear, and corrosion to which such devices are subjected. The object of this invention is to provide a demountable rim of the greatest simplicity and reliability and which shall comprise the smallest possible number of separate parts; the provision of a demountable rim wherein there shall be no necessity for the disconnection of any parts, whereby the possibility of losing or misplacing the parts will be avoided; the provision of securing means which can be made by rapid and expeditious processes, such as forging, and attached to the different parts by similar expeditious processes such as riveting or spot-welding; the provision of a demountable rim which can be rapidly and efficiently "trued up" or brought into the same plane as the felly even by an inexperienced person, and in which the manufacturing tolerance or permissible size variation may be larger than in previous rims without detriment to the operation thereof; the provision of new and improved means for dismounting the rim from the wheel felly; the provision of a device of great strength combined with lightness and elegance; while further objects and advantages of my invention will become apparent in the course of the following description and claims.

Figure 2:
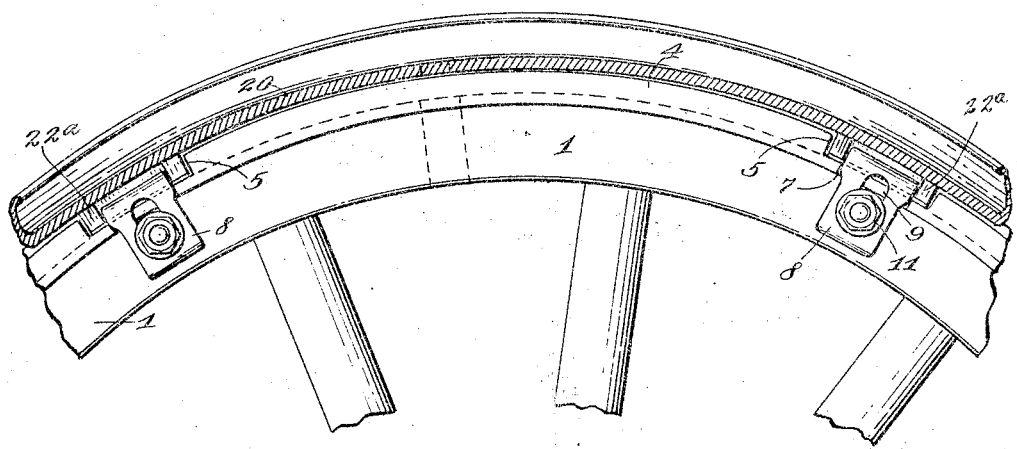

Generally speaking my invention may be defined as consisting of the combinations of elements recited in the claims hereto annexed and illustrated in the drawings accompanying and forming a part hereof, wherein: Figure 1 represents a side elevation of an automobile wheel equipped with a demountable rim of my invention; Fig. 2 represents a detail view of a portion of the same drawn to larger scale, a portion of the demountable rim being broken away and the tire and valve stem omitted; Fig. 3 is a perspective view of a portion of the demountable rim showing one of the wedge blocks carried by the inner surface thereof; Fig. 4 is a perspective view of a portion of the felly and felly band showing a wedge block adapted to coöperate with one of the blocks on the rim; Fig. 5 is a transverse cross sectional view of the felly, rim, and tire taken through the wedge blocks and retaining clips; Fig. 6 is a similar cross sectional view taken through the dismounting device; Fig. 7 represents a development of the interior of the demountable rim; Fig. 8 is a diagrammatic view illustrating the operation of placing the rim upon the felly; Figs. 9 and 10 are cross sectional views similar to Fig. 5 illustrating modified forms of the rim; and Fig. 11 is a detail view of a portion of the felly and rim showing the clip retracted.

Describing the parts by reference characters, 1 represents the felly of a wheel, which may be of wood as in the usual construction and has secured about its periphery a metallic felly band 2 having outwardly turned lateral flanges 3 and 4 defining an annular channel. The flange 3 is preferably slightly higher than the flange 4, while the flange 4 is formed with spaced notches 5—5, the sides of which are substantially radial. In the present embodiment I have illustrated the flange as formed with six such notches, although more or less could be employed without departing from the scope of my invention. Secured to the base of the felly band within each of these notches is a wedge block 6, the thin edge whereof is presented to the notch. These wedge blocks are all exactly alike and may be secured to the felly band by riveting, spot-welding, or in any other convenient manner.

The felly band is preferably of slightly greater width than the felly so as to overhang the same at either side as shown in Figs. 4 to 6, and within the limits of each of the notches 5 the overhanging portion of the felly band is notched away as at 7 for the reception of a rim securing clip 8. Each of these clips consists of a metallic member which may be curved in the direction of its length and has a flat jaw adapted to enter the notch 7. The middle portion of the clip is formed with an elongated slot 9 for the reception of a bolt 10 carried by the felly and provided with a nut 11 whereby the clip is secured in place. The opposite end of the bolt is formed with an enlarged head 12 overlying the flange 3 of the felly band, and may also have a screw 13 whereby it is prevented from turning or from being backed out of the felly. The side of the felly adjacent to the threaded end of the bolt is preferably provided with a metallic wear plate 14 having an out-turned lip 15 adapted to be received in a corresponding notch formed in the end of the clip. This arrangement not only holds the clip firmly in place under operating conditions, and facilitates the mounting of the rim upon the wheel by defining accurately the seated position of the clips, but forms a pivot or fulcrum about which the clip may rock while forcing the demountable rim to its seat. When it is desired to free the demountable rim, it is merely necessary to loosen the nuts 11 by an amount sufficient to permit the clips to be slipped inwardly over the lips 15 and without removing the same completely from the wheel.

The demountable rim is illustrated at 20, and in the form illustrated in Figs. 1 to 8 hereof is of the type illustrated in my copending application filed May 4th, 1911, Ser. No. 625,078. This rim is selected for purposes of the present application by reason of its possession of an inwardly projecting shoulder 21 adjacent to one of the sides thereof, and the comparative size of the rim and felly is such that the shoulder 21 will abut closely against the side of the flange 4 when the rim is fully in place, the base of the rim meanwhile embracing closely the edges of the flanges 3 and 4. The inner surface of the demountable rim is provided at intervals with wedge blocks 22 complementary to the blocks 6, and similarly spaced about the wheel. The larger ends of these wedge blocks are provided with notches 23 adapted to register with the notches 7 when the rim is fully seated, (see Fig. 2), and the clip 8 bears against the bottom of this notch as illustrated in Fig. 5. The width of the base portion of the blocks 22 is the same as that of the notches 5, whereby the edges of the blocks will engage the sides of the notches in a manner to withstand the driving torque of the wheel. This torque may also be withstood in some degree by the engagement of the sides of the clip with the sides of the notches 7 and 23 and also by the frictional engagement between the blocks 6 and 22. The blocks 22 are secured to the rim in any convenient manner as by riveting or welding.

Inasmuch as it is desired to bring the shoulder 21 snugly against the flange 4 when the rim is mounted in place, to the end that the planes of the rim and felly may be caused to coincide without the employment of special care, and inasmuch as the rim must be forcibly wedged upon the blocks 6 at the time when this engagement takes place in order that the parts shall be properly centered and shall be firmly and securely attached together, the different parts must either be made with very great accuracy or with what is known as an extremely small manufacturing tolerance, or some expedient must be adopted for taking up any slight divergence in size which may be present. This result is attained by making the circle defined by the inner faces of the blocks 22 slightly smaller than that defined by similar points of the blocks 6, so that when the rim is fully mounted upon the felly band its shape will be distorted slightly out of circular in the direction of a polygon having a number of angles equal to the number of blocks. The difference between the diameters of these circles need be but very small, but is made just greater than the variation in size of the different rims and felly bands as made by the usual processes. The diametral tolerance allowed in most cases is one thirty-second of an inch, wherefore the difference in size of these circles is preferably between one thirty-second and three-sixty fourths of an inch. Thus if, in assembling, a rim of a size approaching the upper limit of tolerance should be mated with a felly band approaching the lower tolerance limit the engagement would be perfectly snug, while, if the opposite were true, the total difference between the sizes of the circles would be not more than the sum of the two quantities, i. e. five-sixty-fourths of an inch. Owing to the fact that this discrepancy is uniformly distributed about the wheel, the breaking down of the arcs of the various rim segments will be but very small indeed, and will be not only within the limit of resilience of the tire, and within the limit of elasticity of the rim, but also too small to be detected by the eye alone.

The height of the flanges is made sufficiently small to permit this breaking down, although they should preferably project into sufficiently close proximity with the rim to prevent vibration thereof and to withstand disfigurement by contact with obstructions, especially if the wheel should be used for a time with a deflated tire. Otherwise these flanges could be entirely dispensed with, other abutments being employed for coöperation with the shoulder 21.

Obviously the ideal condition would be that in which the inner surface of the rim would be broken down into contact with the edges of these flanges at the same instant when the same has been fully positioned, but this condition, when attained intentionally, involves the very exactness of manufacture which it is the object of this invention to dispense with. Owing to the fact that the only care which need be exercised in securing this rim about the felly band is to see that the shoulder 21 is brought up snugly against the side of the flange 4, which can be accomplished by the simple expedient of setting up the nuts 11 until they are tight, it is obvious that the operation can readily be effected by an unskilled person.

It is a well known fact, however, that every pneumatic tire has a valve stem, and in the conventional type of tire this valve stem projects through registering apertures in the rim and felly. This construction necessitates the insertion of the valve stem through its aperture at the beginning of the mounting operation, and the seating of the rim at this side, after which the remainder of the rim is swung into place about the felly. This requirement, combined with the requirement that the blocks 22 fit snugly into the notches 5, necessitates that these blocks be made of peculiar shape. By referring to Figs. 1 and 7, it will be seen that the valve stem 30 is received in an aperture 31 formed in the rim at a point substantially midway between two of the wedge blocks with which the rim is provided. Owing to the fact that the bolts 10 must be located about the wheel so as not to fall opposite the end of any spoke no matter whether ten spoke or twelve spoke wheels be employed, and, further, inasmuch as the valve stem must project through the felly midway between adjacent spokes so as to be as accessible as possible, it will seldom occur that this aperture will fall midway between adjacent blocks, but this point is immaterial in the operation of my device from the fact that the valve stem is ordinarily sufficiently yielding and has sufficient freedom of movement in the felly aperture to permit considerable variation.

In Figs. 7 and 8, I have indicated the wedge blocks nearest to the valve stem by the reference characters 22$^a$, those farther removed by 22$^b$ and those more nearly opposite by 22$^c$. As shown by the arrow in Fig. 8, the first operation in the process of assembling is the radial movement of the rim with respect to the felly so as to position the stem 30 in the aperture in the felly band, which aperture is elongated laterally as shown in dotted lines, the rim being held in inclined position with respect to the plane of the wheel. Owing to the position of the nearest notches 5—5 their sides are obviously undercut or overhanging as regards the plane of the valve stem. Each of the blocks 22$^a$ is therefore notched or cut away upon the side adjacent to the valve stem as shown at 32 so that it can be moved past the corner of its respective notch as illustrated in Fig. 8. The outer end of this block is made of the full width of its notch as illustrated in Figs. 1 and 2, the thickness of this full sized portion being preferably about the same as that of the flange 4. The edge of the block 22$^b$ adjacent to the valve stem is also beveled or inclined as at 33 so as to enable it to swing freely into its notch. The opposite edge 33$^a$ of the block is not necessarily beveled, but the block is generally made symmetrical so that it may be used on either side of the rim indiscriminately. The blocks 22$^c$ are spaced such a distance from the valve stem that they need not be beveled at all so far as the operation of the device is concerned, but in practice I prefer to employ blocks similar to those at 22$^b$ in order to reduce the number of separate parts required.

As soon as the rim has been applied to the felly in the inclined position illustrated in Fig. 8, it is located as indicated by the curved arrow $b$ about the walls of the notches 32 as a center until the plane of the rim has been brought substantially parallel to that of the wheel. When this has been accomplished, it will be seen that the rim can be shifted sidewise as a whole so as to bring all of its blocks fully into their respective notches and against the inclined surfaces of the complementary blocks 6, the assembling being complete when the shoulder 21 has been brought up snugly against the flange 4 as above described. The valve stem is first inserted into its aperture in inclined position, then rotated to the outer side of the aperture, and finally moved sidewise to its proper place.

Reference has already been made to the fact that the height of the flange 4 is less than that of the flange 3, the flange 3 preferably projecting into rather close proximity to the rim for stiffening and dirt excluding purposes, the flange 4 being necessarily smaller than this to permit the swinging of the rim. This flange is, therefore, spaced slightly from the interior of the rim when the mounting is complete, but the gap so left is completely covered by the shoulder 21 so that no unsightly and dirt collecting aperture is left. The stiffness of this side of the rim is also greater than that of the other side by reason of the shoulder 21, however that shoulder be produced. The need for employing this flange as a reinforcement of the rim is less than the need for the flange 3, though it would certainly act in the same manner upon occasion.

In Fig. 9, I have illustrated a modified form of my invention wherein a different type of rim 20ª is employed, the type selected being a rim of the ordinary clencher type having both flanges integral. In this embodiment I have shown the rim as provided with an annular inwardly projecting rib 21ª adapted to engage the exterior of the flange 4 so as to define the assembled position of the rim. The same blocks 22, clips 8, etc., are employed as in the preceding instance.

In Figs. 10 and 11 I have illustrated a third embodiment of my invention. In this case I have illustrated a simple clencher rim 20ᵇ with integral flanges (although it is obvious that any other type of rim could be employed with equal facility), but instead of providing the rim with a shoulder adapted to engage the flange 4, I provide the interior thereof with blocks 22ᵇ, similar in all respects to the blocks before described excepting as to the possession of a radially extending lip 35 at each side of the notch 23. The felly band is made the same as before excepting that the notch 7 is replaced by a notch 7ª whose dimensions are the same as those of the notch 5, thus giving space for the lips 35 at the sides of the clip 8. The clip 8 and its associated parts are the same as in the preceding instances.

It will therefore be seen that the present invention is entirely independent of the particular form of rim employed, but is concerned solely with the method of securing that rim to the wheel felly, advantage being taken of such structural peculiarities of different rims as may be possible in accomplishing the end in view.

For facilitating the removal of the rim from the wheel felly I have provided the device illustrated in Figs. 1 and 6 hereof. This device consists of a reciprocable member 40 having an abutment 41 adapted to engage the shoulder 21, and a right angular portion 42 overlying the felly of the wheel. A laterally opening socket 43 is mounted in the wheel felly and in this socket is threaded a cap screw 44, the head whereof is swiveled to the portion 42 so as to cause it to move in both directions. Many methods of effecting this construction will be obvious to any mechanic, the method illustrated herein comprising the slotting of the portion 42 and the springing of the walls thereof sufficiently to permit their introduction into an annular groove 45 formed between the head of the screw and a collar 46. In removing the rim from the felly this screw may be rotated so as to bring the abutment 41 against the shoulder 21 (or rib 21ª as the case may be) whereby the rim is displaced from the felly for a considerable extent, after which the member 40 may be returned to its place. The movement given to the rim will have been sufficient to remove all the strain therefrom and slacken it from the blocks 6, and the remaining movement necessary to the removal thereof can be accomplished without difficulty.

It will be obvious that, since my present invention concerns merely the method of securing the rim to the felly band, the particular construction of the rim is unimportant. It is also evident that the construction of the felly band is also unimportant excepting as to the particular features thereof which coöperate directly with the features of the rim. While I have described my invention in detail I do not therefore limit myself to such details except as the same may be positively included in the claims hereto annexed or may be rendered necessary by the prior state of the art.

Having thus described my invention, what I claim is:

1. In a vehicle wheel, in combination, a felly band having a plurality of spaced, laterally-opening notches, the sides whereof are substantially radial, a demountable rim adapted to embrace said felly band and having spaced blocks upon its internal surface adapted to enter said notches, said felly band having a valve-stem-receiving-aperture located substantially midway between adjacent notches and said rim having a valve-stem-receiving-aperture similarly located with respect to adjacent blocks, the sides of the blocks adjacent to said aperture being cut away so as to permit said blocks to be inserted into their notches simultaneously with the insertion of the valve stem into the felly aperture, the remaining rim blocks having their sides adjacent to said aperture inclined so as to permit the blocks to be inserted into their respective notches by a swinging movement about the apertured side of said felly band.

2. In a vehicle wheel, the combination with a felly, and a felly band embracing the same, said felly band having laterally opening spaced notches and inclined portions opposite said notches, of a demountable rim adapted to surround said felly band and having spaced wedge blocks adapted to enter said notches and seat upon said inclined portions, the sides of said notches and of said blocks being substantially radial, and the outer ends of said blocks being of a size substantially to fill said notches, the length of said blocks being such that their outer ends will be substantially flush with the side of said felly band when the rim is fully mounted and the ends of said blocks being formed with radial notches, a transverse bolt carried by said felly opposite each notch, and a radial clip secured to each bolt and adapted to engage the notch in the corresponding block.

3. In a vehicle wheel, the combination with a felly, and a felly band embracing the same and overhanging the sides thereof, said felly band having laterally opening spaced notches and inclined portions opposite said notches, of a demountable rim adapted to surround said felly band and having spaced wedge blocks adapted to enter said notches and seat upon said inclined portions, the sides of said notches and of said blocks being substantially radial, and the outer ends of said blocks being of a size substantially to fill said notches, the length of said blocks being such that their outer ends will be substantially flush with the side of said felly band when the rim is fully mounted and the ends of said blocks being formed with radial notches, a transverse bolt carried by said felly opposite each notch, and a radial clip secured to each bolt and adapted to engage the notch in the corresponding block, the overhanging edge of said felly band being cut away adjacent to said bolt for the reception of said clip.

4. In a vehicle wheel, the combination with a felly band having outwardly turned lateral flanges, one of said flanges being formed with circumferentially spaced notches, of inclined portions on said band registering with such notches, a demountable rim adapted to surround said felly band and having wedge blocks adapted to enter such notches and seat upon said inclined portions, and laterally facing abutments on said rim and band adapted to inter-engage when the former is fully seated on the latter, said wedge blocks being adapted in such seated position of said rim to engage the sides of such notches.

5. In a vehicle wheel, the combination with a felly band having a plurality of circumferentially spaced laterally inclined portions and a valve-stem-receiving aperture located between two adjacent inclined portions, a demountable rim adapted to surround said felly band and having wedge blocks adapted to seat upon such inclined portions, and an aperture adapted to register with the aperture in said felly band, means adapted to clamp said rim in seated position on said felly band, and means substantially diametrically opposite from such apertures adapted to positively withdraw the adjacent portion of said rim laterally from said felly band.

6. In a vehicle wheel, the combination with a felly band, having outwardly turned flanges at its edges defining an annular channel, one of said flanges being formed with spaced notches and also having a notch intermediate between one pair of said first notches, of a demountable rim adapted to surround said felly band and having spaced wedge blocks adapted to enter said first notches, complementarily inclined wedge blocks carried by said felly band adapted to be engaged by said first wedge blocks, a reciprocable member projecting through said last notch and having a head overlying the side of said felly, a protuberance carried by said rim outside of said member, and means engaging said head and felly for moving said member laterally against said protuberance to displace said rim from said felly band.

7. In a vehicle wheel, the combination, with a felly band provided with outwardly turned lateral flanges, one of said flanges having spaced laterally opening notches of inclined portions on said band registering with said notches, a demountable rim adapted to surround said felly band and having wedge blocks adapted to enter said notches and seat upon said inclined portions, said wedge blocks having abrupt radial extensions at their larger ends adapted to engage said felly band whereby the coincidence of the planes of said rim and band is assured, and clips adapted to engage said blocks and maintain the same within their notches.

8. In a vehicle wheel, the combination, with a felly band provided with outwardly turned lateral flanges, one of said flanges having spaced laterally opening notches of inclined portions on said band registering with said notches, said notches merging with other radial notches extending inwardly therefrom, and a demountable rim adapted to surround said felly band and having spaced wedge blocks adapted to enter said notches and seat upon said inclined portions, spaced radial extensions carried by the larger ends of said blocks adapted to enter said radial notches whereby the coincidence of the planes of said rim and band is assured, and clips adapted to engage said blocks and maintain the same within their notches, said radial extensions being spaced apart so as to permit the seating of said clip therebetween.

In testimony whereof, I hereunto affix my signature in the presence of two witnesses.

RICHARD S. BRYANT.

Witnesses:
HAROLD E. SMITH,
J. B. HULL.